(12) United States Patent
Nagano et al.

(10) Patent No.: US 9,553,290 B2
(45) Date of Patent: Jan. 24, 2017

(54) GAS DISCHARGE STRUCTURE FOR BATTERY COVER

(71) Applicant: Nissan Motor Co., Ltd., Kanagawa (JP)

(72) Inventors: Rumi Nagano, Kanagawa (JP); Toyoki Iguchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/404,649

(22) PCT Filed: Jun. 3, 2013

(86) PCT No.: PCT/JP2013/065385
§ 371 (c)(1),
(2) Date: Dec. 1, 2014

(87) PCT Pub. No.: WO2013/187277
PCT Pub. Date: Dec. 19, 2013

(65) Prior Publication Data
US 2015/0147612 A1  May 28, 2015

(30) Foreign Application Priority Data

Jun. 12, 2012 (JP) .................. 2012-132593

(51) Int. Cl.
*H01M 2/08* (2006.01)
*H01M 2/12* (2006.01)
(Continued)

(52) U.S. Cl.
CPC .............. *H01M 2/1264* (2013.01); *B60K 1/04* (2013.01); *B60L 3/0069* (2013.01); *B60L 11/14* (2013.01);
(Continued)

(58) Field of Classification Search
CPC ............ B60K 1/04; B60L 11/14; B60L 11/18; B60L 11/1864; B60L 11/1879; B60L 2210/40; H01M 2220/20; H01M 2/10; H01M 2/1083; H01M 2/12; H01M 2/1252; H01M 2/1264; Y02T 10/70; Y02T 10/7005; Y02T 10/7061; Y02T 10/7077; Y02T 10/7241
See application file for complete search history.

(56) References Cited

U.S. PATENT DOCUMENTS

2005/0166882 A1* 8/2005 Suzuki ............... F02D 41/2451
123/143 C
2010/0116570 A1 5/2010 Sugawara et al.

FOREIGN PATENT DOCUMENTS

JP 2004-148850 * 5/2004 ............... B60K 1/04
JP 2004-148850 A 5/2004
(Continued)

OTHER PUBLICATIONS

International Search Report for corresponding International Application No. PCT/JP2013/065385, mailed Jul. 2, 2013 (2 pages).
(Continued)

*Primary Examiner* — Patrick Ryan
*Assistant Examiner* — Ben Lewis
(74) *Attorney, Agent, or Firm* — Osha Liang LLP (57) ABSTRACT

A gas discharge structure for a battery cover has a battery cover that covers part or all of a battery, a first hose that is connected with the battery cover at a position of a through-hole provided on the battery cover, and an electric wire that is electrically connected to the battery, is inserted into the first hose, and is drawn out to an outside of a vehicle compartment through an electric-wire lead-out hole provided on a vehicle body panel. A space formed between the electric wire and the first hose communicates with a space inside the battery cover. An end portion of the first hose is
(Continued)

located at a position corresponding to the electric-wire lead-out hole, so that an opening of the space formed between the electric wire and the first hose faces the outside of the vehicle compartment.

9 Claims, 9 Drawing Sheets (51) Int. Cl.
    *B60K 1/04*     (2006.01)
    *B60L 11/14*     (2006.01)
    *B60L 11/18*     (2006.01)
    *H01M 2/10*     (2006.01)
    *B60L 3/00*     (2006.01)

(52) U.S. Cl.
    CPC ........ *B60L 11/1864* (2013.01); *B60L 11/1879* (2013.01); *H01M 2/10* (2013.01); *H01M 2/1083* (2013.01); *H01M 2/12* (2013.01); *H01M 2/1252* (2013.01); *B60L 2210/40* (2013.01); *H01M 2220/20* (2013.01); *Y02T 10/70* (2013.01); *Y02T 10/7005* (2013.01); *Y02T 10/7061* (2013.01); *Y02T 10/7077* (2013.01); *Y02T 10/7241* (2013.01); *Y02T 90/16* (2013.01)

(56) References Cited

FOREIGN PATENT DOCUMENTS

| JP | 2004-243855 A | 9/2004 |
| JP | 2009-117149 A | 5/2009 |
| JP | 2010-113999 A | 5/2010 |

OTHER PUBLICATIONS

Written Opinion for corresponding International Application No. PCT/JP2013/065385, mailed Jul. 2, 2013 (5 pages).

International Preliminary Report on Patentability for corresponding International Application No. PCT/JP2013/065385, mailed Dec. 26, 2013 (3 pages).

* cited by examiner

GAS DISCHARGE STRUCTURE FOR BATTERY COVER

CROSS-REFERENCE TO RELATED APPLICATIONS

The present application claims the priority based on Japanese Patent Application No. 2012-132593 filed in Japan on Jun. 12, 2012, and the entire content thereof is incorporated herein by reference.

BACKGROUND

Technical Field

The present invention relates to a gas discharge structure for discharging gas existing in a battery cover to the outside thereof.

Related Art

For example, a lithium-ion battery used for an electric vehicle is placed in the vehicle in a state where the lithium-ion battery is accommodated in a case. As described in Patent Document 1 listed below, there is a known structure for discharging gas generated within the case to the outside thereof. In this structure, a dedicated pipe designed for discharging the gas to the outside of a vehicle compartment is connected to the case, and this dedicated pipe is drawn out to the outside of the vehicle compartment.

CITATION LIST

Patent Literature

Patent Literature 1: Japanese Patent Laid-Open Publication No. 2010-113999

SUMMARY

Incidentally, batteries for an electric vehicle may be disposed within the vehicle compartment such as below a seat or within a console box in order to ensure the compartment space and the luggage space. In such a configuration, electric wires or the like to be connected with the batteries are drawn out to the outside of a case, and these electric wires are made to pass through a hole formed on a floor panel or a dash panel, and to draw out to an engine compartment located outside the vehicle compartment.

Thus, in the case where the dedicated pipe is provided to discharge the gas existing in the case as described above, it is necessary that a hole for drawing out this pipe to the outside of the vehicle compartment is separately formed on a vehicle body panel such as a dash panel and a floor panel, and the number of holes to be formed on the vehicle body panel increases by providing additional hole for the pipe for gas discharge. As a result, noise is more likely to come into the vehicle compartment from the outside of the vehicle compartment through the holes formed on the vehicle body panel.

One or more embodiments of the present invention discharges the gas existing in the battery cover to the outside of the vehicle compartment without forming, on the vehicle body panel, any dedicated hole for drawing out a pipe for gas discharge to the outside of the vehicle compartment.

One or more embodiments of the present invention provides a gas discharge structure for a battery cover including: a battery cover that covers a battery; a first hose that is connected with the battery cover at a position of a through-hole provided on the battery cover; and an electric wire that is inserted into the first hose, is drawn out to an outside of a vehicle compartment through an electric-wire lead-out hole provided on a vehicle body panel, and is electrically connected to the battery, in which a space formed between the electric wire and the first hose communicates with a space inside the battery cover, and an end portion of the first hose is located at a position corresponding to the electric-wire lead-out hole, so that an opening of the space formed between the electric wire and the first hose faces the outside of the vehicle compartment.

BRIEF DESCRIPTION OF DRAWINGS

FIGS. 4(a)-4(b) illustrate the first embodiment of the present invention.

DETAILED DESCRIPTION

Next, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that, in the descriptions of the drawings below, the same or similar reference characters are attached to the same or similar portions. However, it should be noted that these drawings are schematic drawings, and hence, proportions of each dimension are different from those of the actual things. Thus, specific dimensions should be judged by taking the following descriptions into consideration. Furthermore, dimensional relationships or proportions of dimensions may be partially different between the drawings.

(First Embodiment)

FIGS. 1 to 4 each illustrates a gas discharge structure for a battery cover according to a first embodiment of the present invention.

Figure 1:
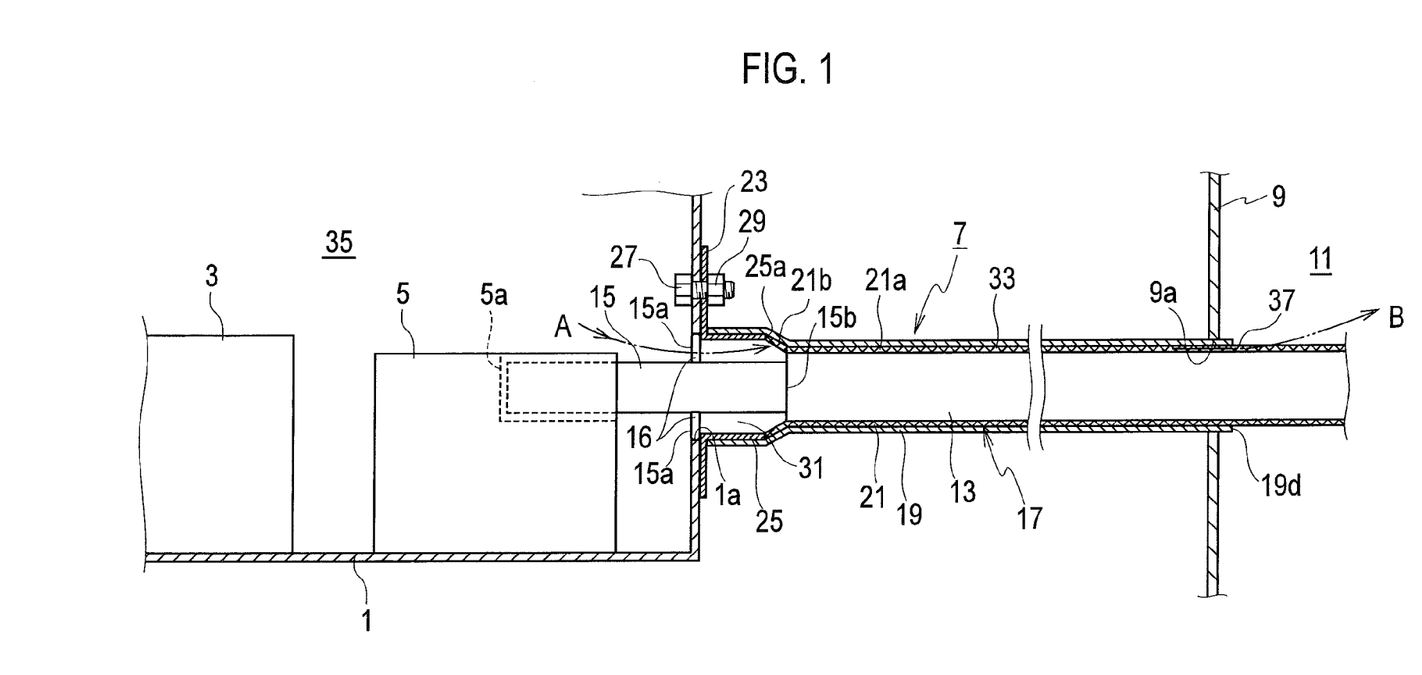
FIG. 1 illustrates a first embodiment of the present invention, and is a sectional view illustrating a gas discharge structure for a battery cover.
Figure 2:
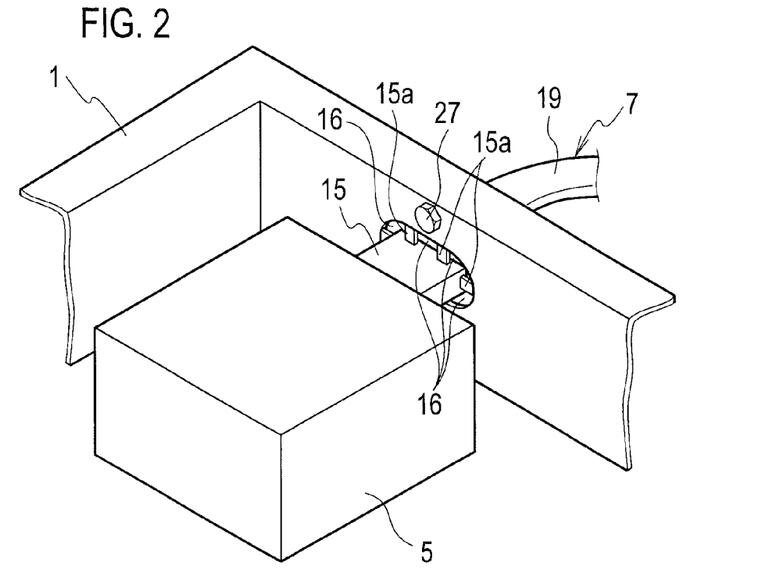
FIG. 2 illustrates the first embodiment of the present invention, and is a perspective view illustrating the gas discharge structure for a battery cover illustrated in FIG. 1.
Figure 3:
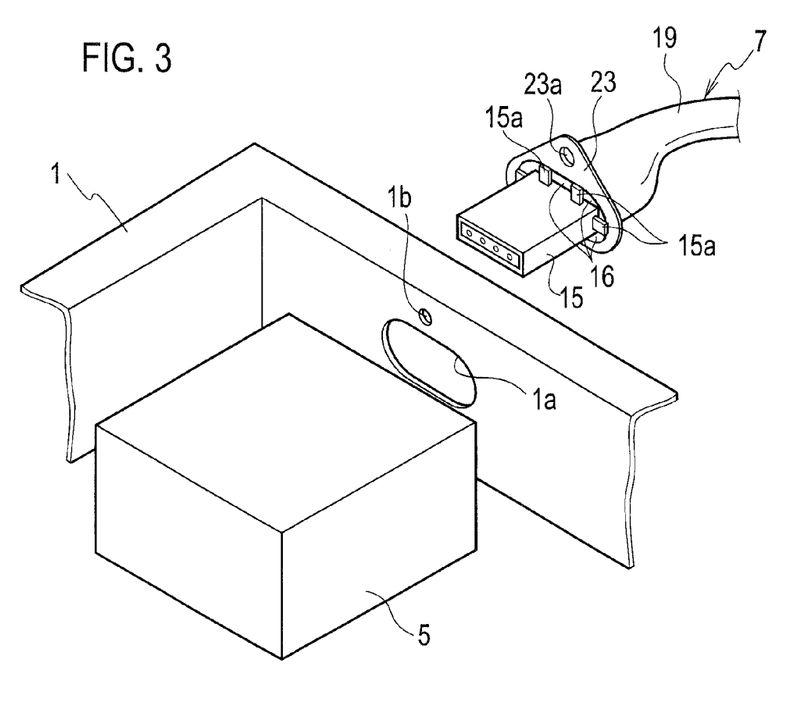
FIG. 3 illustrates the first embodiment of the present invention, and is a perspective view illustrating a state in which, in association with FIG. 2, a connector of a high voltage cable is detached from the battery cover.
Figure 4:
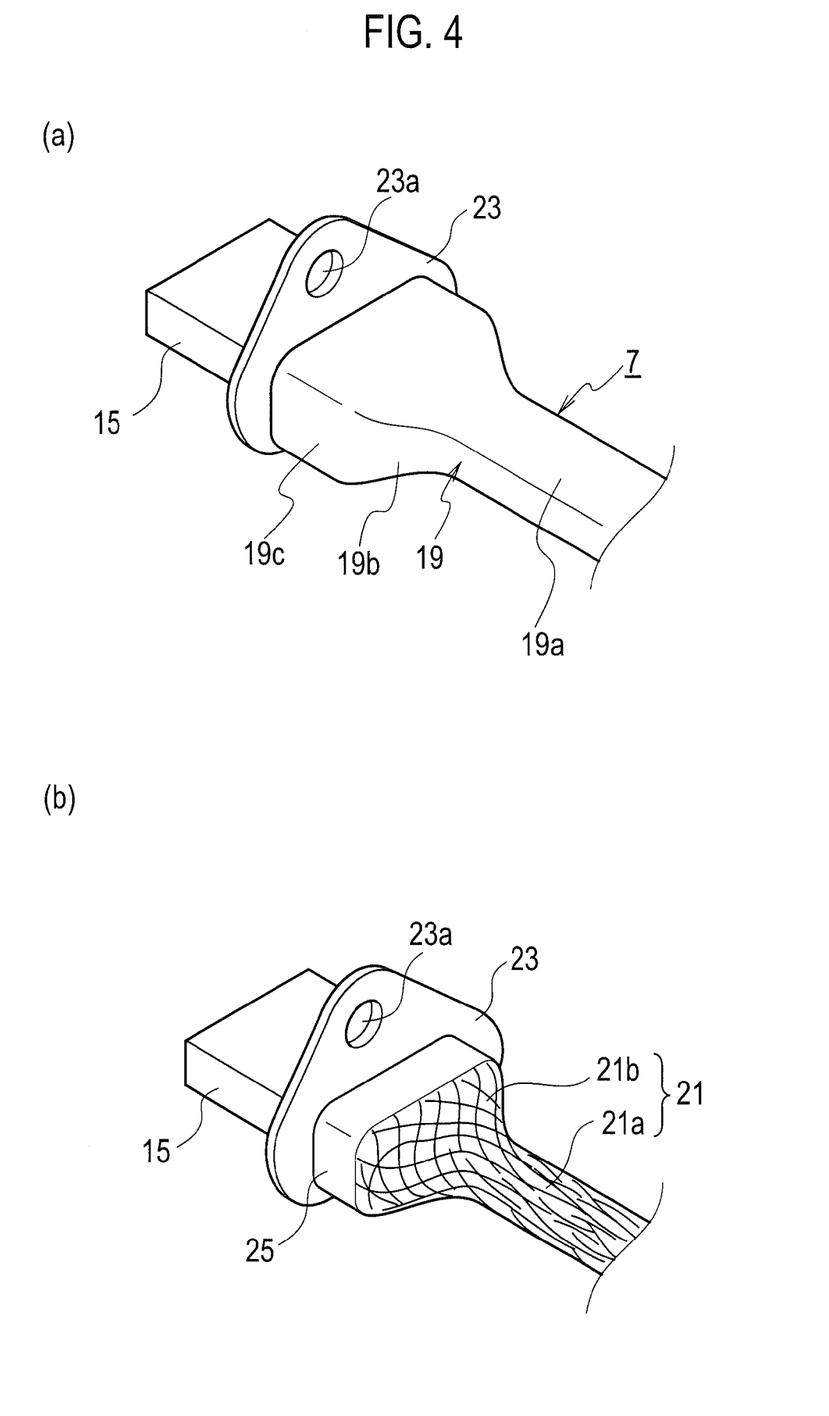
FIG. 4(a) is a perspective view illustrating a connector of a high voltage cable and its surroundings.
FIG. 4(b) is a perspective view illustrating a state in which the hose in FIG. 4(a) is omitted.

FIG. 1 is a sectional view illustrating a gas discharge structure for a battery cover according to this embodiment. FIG. 2 is a perspective view illustrating the gas discharge structure for a battery cover according to this embodiment. FIG. 3 is an exploded perspective view illustrating the gas discharge structure for a battery cover according to this embodiment, and is a view illustrating a state in which, in association with FIG. 2, a connector of a high voltage cable is removed from the battery cover. FIG. 4(a) is a perspective view illustrating a connector of a high voltage cable and its surroundings according to this embodiment, and FIG. 4(b) is a perspective view illustrating a state in which a hose illustrated in FIG. 4(a) is omitted.

As illustrated in FIG. 1, a battery cover 1 accommodates a battery module 3 serving as a battery. The battery module 3 includes a battery pack formed by combining plural cells. For example, a lithium-ion battery provided in the electric vehicle is used as the cells. Additionally, within the battery cover 1, a junction box 5 and inverter, not illustrated, are provided, and electric power from the battery module 3 passes through the inverter, the junction box 5, and a high voltage cable 7, and is supplied to a motor for driving a vehicle, not illustrated.

It should be noted that the battery cover 1 illustrated in FIGS. 2 and 3 shows an opened upper part, but a non-illustrated lid body is provided so as to cover this opened upper part.

The battery cover 1 is disposed within the vehicle compartment such as in a console box. The high voltage cable 7 is led out from an electric-wire lead-out hole 9a of a dash panel 9 constituting a vehicle body panel into an engine compartment (motor compartment) 11 accommodating the motor for driving the vehicle described above and located outside the vehicle compartment, and is connected to the motor for driving the vehicle.

The high voltage cable 7 has a connector 15 at an end portion of an electric wire body 13 serving as an electric wire formed by a covered wire. This connector 15 is inserted into a connector inserting hole 1a serving as a through-hole formed on a side wall of the battery cover 1, and is connected with a connector portion 5a of the junction box 5. With this configuration, the electric wire body 13 is electrically connected to the battery module 3.

Plural projected pieces 15a are provided in a standing manner on four peripheral sides of the outer portion of a housing of the connector 15. In a state illustrated in FIG. 1 in which the connector 15 is connected with the connector portion 5a, the projected pieces 15a described above are located at positions corresponding to the through-hole 1a, and the end portions of the projected pieces 15a are substantially brought into contact with the inner peripheral surface of the through-hole 1a. With this configuration, the connector 15 is positioned in the through-hole 1a, and at the same time, gaps 16 as illustrated in FIG. 2 are formed between each of adjacent projected pieces 15a around the connector 15.

In the high voltage cable 7, the outer periphery of the electric wire body 13 is covered with a grounding member 17 and a hose 19 (first hose). The grounding member 17 includes a mesh 21 serving as a net-like member covering the outer periphery of the electric wire body 13, a mounting flange 23 to be fixed to a side wall of the battery cover 1, and a tube portion 25 located between the mesh 21 and the mounting flange 23. The mesh 21 is formed from a fluid-permeable member that allows fluid to pass therethrough.

In this embodiment, the hose 19 through which the electric wire body 13 passes is used as a hose for drawing out the electric wire.

The entire grounding member 17 is made of an electrically conductive material, and the mounting flange 23 has a mounting hole 23a. On the other hand, as illustrated in FIG. 3, the battery cover 1 has a battery-cover-end mounting hole 1b located above the connector inserting hole 1a so as to correspond to the mounting hole 23a. Furthermore, in a state where the battery-cover-end mounting hole 1b and the mounting hole 23a are aligned with each other, a bolt 27 illustrated in FIGS. 1 and 2 is inserted from the inside of the battery cover 1, and is fastened with a nut 29 from the outside of the battery cover 1.

The tube portion 25 of the grounding member 17 is configured with a plate-like member in a similar manner to the mounting flange 23. This tube portion 25 covers the outside periphery of a portion of the connector 15 located outside of the battery cover 1 in a manner such that a communication passage 31 is formed between this tube portion 25 and the connector 15. The connector 15 has a flattened cuboid shape, and accordingly, the outer shape of the tube portion 25 is formed into a substantially flattened cuboid shape as illustrated in FIG. 4(b). Note that FIG. 4(b) is a view in which the hose 19 is omitted from that illustrated in FIG. 4(a).

As illustrated in FIG. 1, the tube portion 25 described above is located on the outer peripheral side of the outer peripheral surface of the electric wire body 13 and expands outer side of the mesh 21, and an end portion 25a of the tube portion 25 located at an end opposite to the mounting flange 23 is located closer to the battery cover 1 than an end portion 15b of the connector 15 located on the side of the electric wire body 13. For this reason, the mesh 21 has a sloped portion 21b externally expanding toward the tube portion 25 from a main body portion 21a that is a portion substantially brought into contact with the outer peripheral surface of the electric wire body 13.

The inner peripheral surface of the tube portion 25 is located closer to the outer peripheral surface of the connector 15 than the top end of each of the projected pieces 15a of the connector 15 along a protruding direction of each of the projected pieces 15a. With this configuration, the side surface of the top end of each of the projected pieces 15a is brought into contact with the side surface of the mounting flange 23. In this state, the communication passage 31 located inside of the tube portion 25 is communicated with a gas collection space 35 within the battery cover 1 through the gaps 16 between the projected pieces 15a.

The hose 19 is made of, for example, resin that does not allow gas to pass therethrough, covers the tube portion 25 and the mesh 21 (the main body portion 21a and the sloped portion 21b) so as to be brought into substantially airtight contact with the perimeter of the tube portion 25 and the mesh 21, and is designed so as to adapt to the shapes of the tube portion 25 and the mesh 21. In other words, this hose 19 includes a small diameter portion 19a corresponding to the main body portion 21a of the mesh 21, a sloped portion 19b corresponding to the sloped portion 21b of the mesh 21, and an enlarged portion 19c corresponding to the tube portion 25.

At this time, the main body portion 21a of the mesh 21 is accommodated in a space 33 formed between the electric wire body 13 and the hose 19. Furthermore, the sloped portion 21b of the mesh 21 faces the communication passage

31. Thus, the air space within the mesh portion of the main body portion 21*a* is communicated with the communication passage 31 through the air space within the mesh portion of the sloped portion 21*b*. Furthermore, the communication passage 31 and the gas collection space 35 within the battery cover 1 are communicated with each other through the connector inserting hole 1*a* (gap 16) of the battery cover 1.

In other words, the gas collection space 35 within the battery cover 1 is communicated with the air space within the main body portion 21*a* of the mesh 21.

On the other hand, the high voltage cable 7 passes through the dash panel 9 as described above, and is drawn out into the engine compartment (motor compartment) 11. At this time, an end portion 19*d* of the hose 19 is made slightly protruded from the electric-wire lead-out hole 9*a* of the dash panel 9 into the engine compartment (motor compartment) 11, or is located at a position substantially equal to the electric-wire lead-out hole 9*a*.

With this configuration, the passage from the gas collection space 35 within the battery cover 1 through the connector inserting hole 1*a* (gap 16) and the communication passage 31 to the air space within the mesh 21 is configured to have an opening 37 that opens to the inside of the engine compartment (motor compartment) 11.

In other words, the electric wire is made to pass through the electric-wire lead-out hole 9*a* of the dash panel 9 serving as the vehicle body panel, and is drawn out into the engine compartment 11 located outside the vehicle compartment. Furthermore, the end portion 19*d* of the hose 19 is placed at a position corresponding to the electric-wire lead-out hole 9*a*, so that the opening 37 of the space 33 faces the outside of the vehicle compartment.

Next, operations will be described. As illustrated with the arrow A in FIG. 1, released fluid generated in the battery cover 1 such as released gas, for example, from the lithium-ion battery of the battery module 3 reaches the communication passage 31 located within the tube portion 25 of the grounding member 17 from the gap 16 of the connector inserting hole 1*a* for the high voltage cable 7 to be drawn out from the inside of the battery cover 1 to the outside thereof. The gas entering the communication passage 31 passes through the air space within the sloped portion 21*b* of the mesh 21 of the grounding member 17, and flows toward the air space within the main body portion 21*a*.

At this time, the mounting flange 23 is fixed with a bolt 27 and a nut 29 to bring the mounting flange 23 into airtight contact with the outer surface of the battery cover 1, thereby preventing the gas within the battery cover 1 from leaking to the outside of the battery cover 1.

The gas flowing through the air space within the main body portion 21*a* of the mesh 21 flows along a cabling direction of the high voltage cable 7, and, as illustrated with an arrow B in FIG. 1, is discharged from the opening 37 into the engine compartment (motor compartment) 11 at which the end portion 19*d* of the hose 19 is located.

As described above, according to this embodiment, the gas within the battery cover 1 is made to pass through the space 33 between the electric wire body 13 of the high voltage cable 7 drawn out from the battery cover 1 and the hose 19 covering the periphery of the electric wire body 13, and is discharged to the outside (outside the vehicle compartment). Thus, it is possible to discharge the gas within the battery cover 1 to the outside of the vehicle compartment without providing any hole that allows a dedicated pipe for discharging gas within the battery cover 1 to pass through on the vehicle body panel such as a dash panel or a floor panel.

In other words, there is no need to form any dedicated hole on the vehicle body panel for drawing out a pipe for gas discharge, and there is no need to additionally form a hole on the vehicle body panel for discharging the gas. Thus, as compared with a case where a hole for discharging gas is additionally provided on the vehicle body panel, the number of holes to be formed on the vehicle body panel can be reduced, thereby suppressing intrusion of noise from the outside of the vehicle compartment to the inside of the vehicle compartment through the holes.

Furthermore, since the dedicated pipe for gas discharge is not needed, it is possible to simplify works for assembling and reduce the number of parts, whereby the effect of cost reduction is expected.

Furthermore, in this embodiment, in order to guarantee the gas discharge passage, the high voltage cable 7 having a larger thickness (larger diameter) is used rather than, for example, a low voltage cable or signal lines. Thus, the cross sectional area of the passage of the space 33 or communication passage 31 between the electric wire body 13 and the hose 19 serving as a passage for making the gas pass through is further increased, whereby it is possible to discharge the gas in a more efficient manner.

Furthermore, in this embodiment, the mesh 21, which is a fluid-permeable member that allows fluid to pass therethrough, is accommodated in the space 33 between the electric wire body 13 and the hose 19. This mesh 21 functions as a filter, and catches, for example, a foreign substance such as a bug or an unwanted substance, whereby it is possible to prevent such foreign substance from entering the vehicle compartment from the outside of the vehicle compartment. Furthermore, with the intervention of the mesh 21 in the space 33, it is possible to prevent the space 33 from flattening, and the space 33 serving as the passage for the gas can be ensured, whereby it is possible to more reliably discharge the gas.

The mesh 21 described above constitutes part of the grounding member 17 made of the electrically conductive material, and is grounded (earthed) to the battery cover 1 and the vehicle body through the tube portion 25 and the mounting flange 23 of the grounding member 17. In other words, part of the grounding member 17 is used to guarantee the passage for discharging gas, which means that parts are effectively utilized.

It should be noted that not only the mesh 21 but also a sponge or other porous members that allow fluid to pass therethrough may be provided to intervene in the space 33 between the electric wire body 13 and the hose 19, or, it may be possible that no fluid-permeable member is used for intervention. In the case where no electrically conductive fluid-permeable member is provided, it is necessary to separately provide parts for grounding in place of the grounding member 17.

By using the mesh 21, which is a net-like member, as the fluid-permeable member described above, it is possible to make the gas flow smoother while guaranteeing the space 33.

Furthermore, in this embodiment, the mounting flange 23 is integrally provided to the mesh 21 as the electrically conductive grounding member 17, and this mounting flange 23 is fixed to the battery cover 1 around the connector inserting hole 1*a*. With this configuration, it is possible to easily establish grounding only by fixing the mounting flange 23 to the battery cover 1.

Furthermore, in this embodiment, the connector 15 to be connected with the junction box 5 is inserted into the connector inserting hole 1*a*, and the communication passage 31 that allows the gas collection space 35 within the battery cover 1 and the space 33 to communicate with each other is provided between the connector 15 and the mounting flange 23. With this configuration, it is possible to allow the gas collection space 35 within the battery cover 1 and the space 33 to reliably communicate with each other through the communication passage 31, whereby it is possible to discharge the gas generated within the battery cover 1 to the outside of the vehicle compartment.

(Second Embodiment)

FIGS. 5 to 8 each illustrates a gas discharge structure for a battery cover according to a second embodiment of the present invention.

Figure 5:
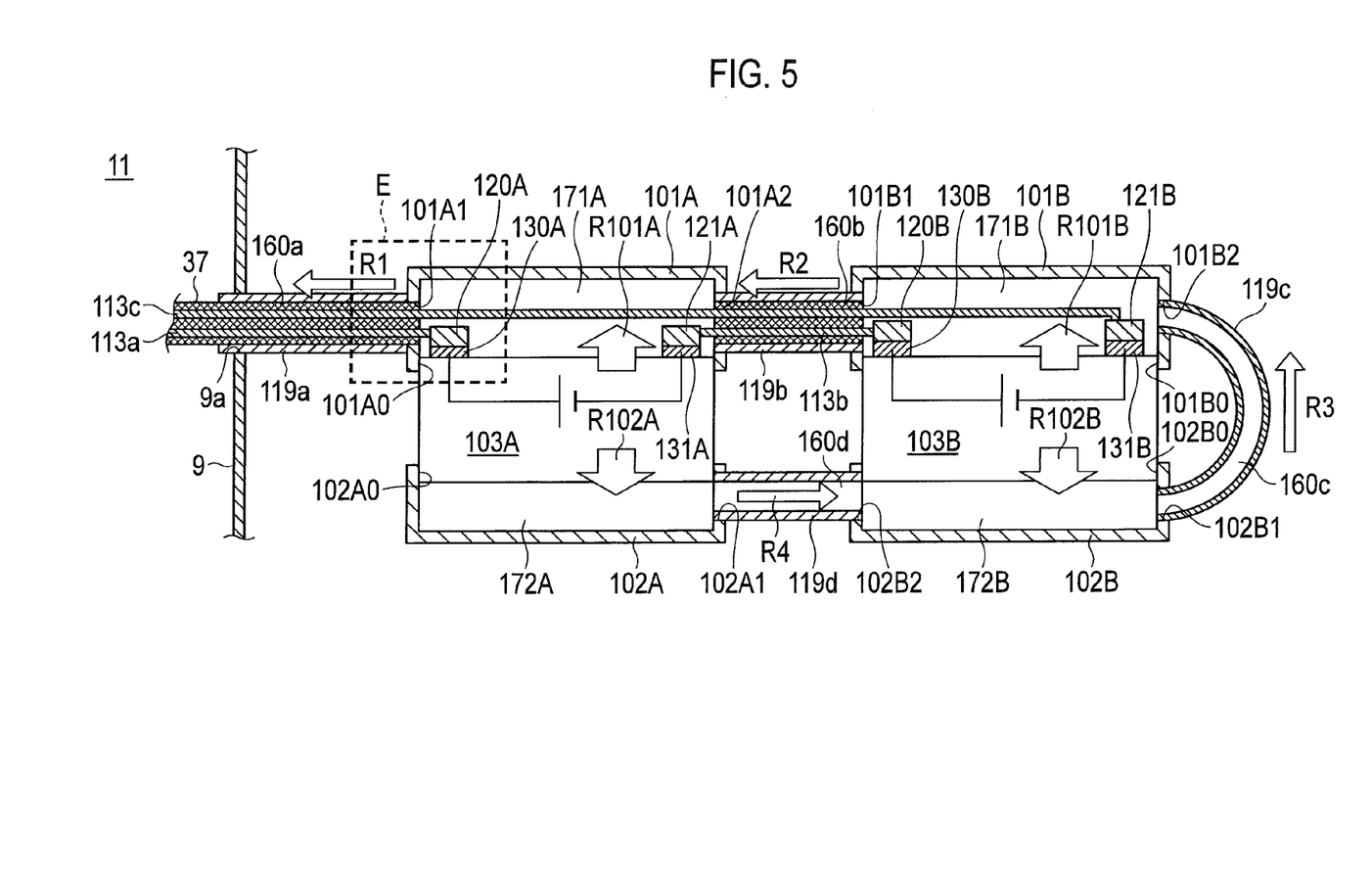
FIG. 5 illustrates a second embodiment of the present invention, and is a sectional view illustrating a gas discharge structure for a battery cover.
Figure 6:
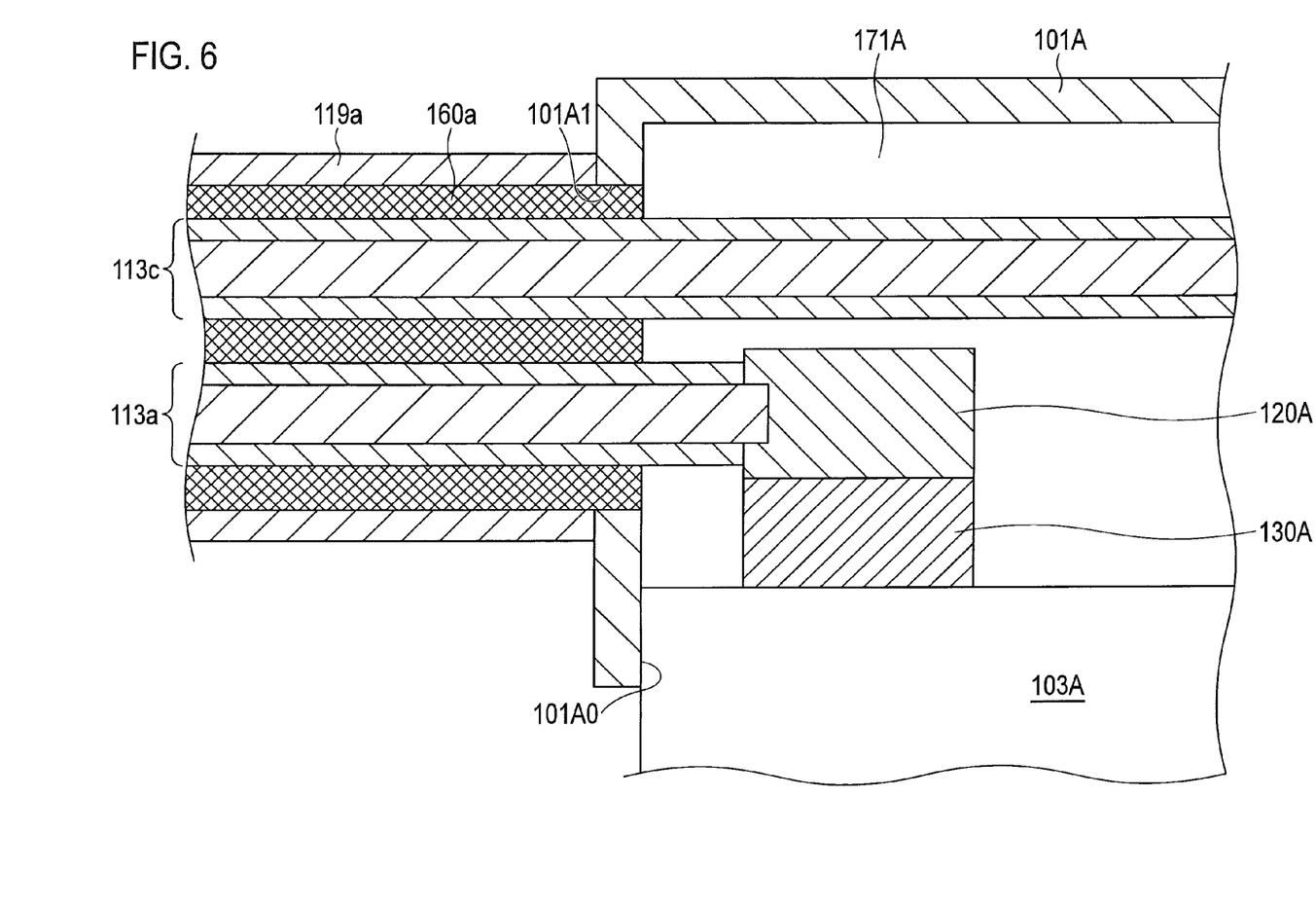
FIG. 6 illustrates the second embodiment of the present invention, and is a diagram in which the main portions in FIG. 5 are enlarged.
Figure 7:
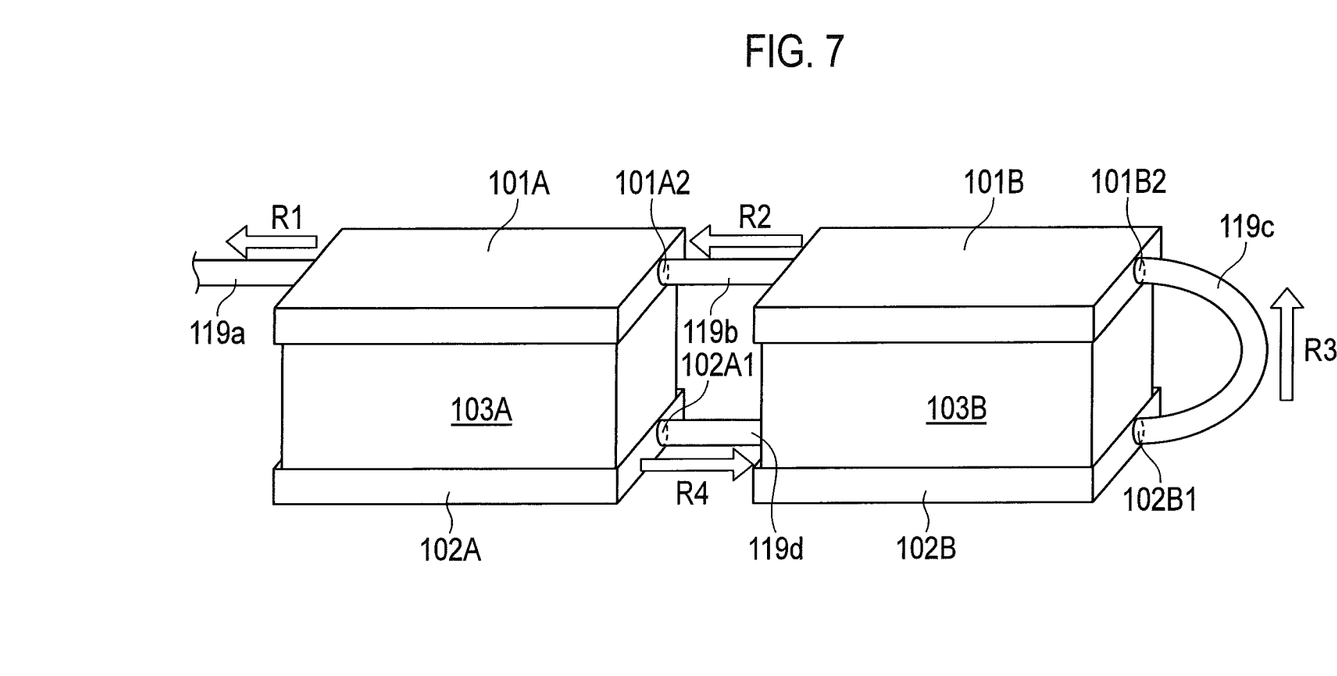
FIG. 7 illustrates the second embodiment of the present invention, and is a perspective view illustrating the gas discharge structure for a battery cover.
Figure 8:
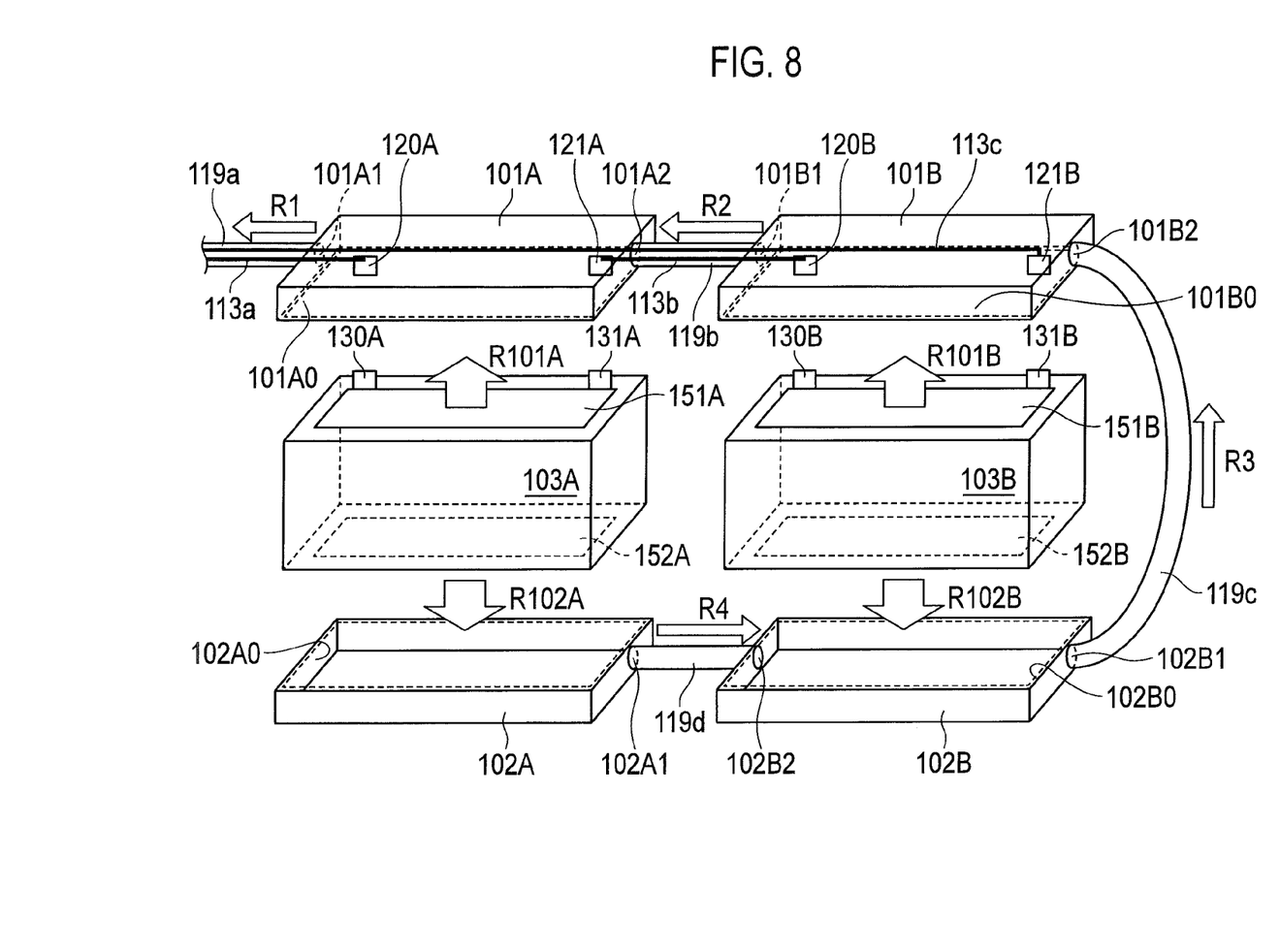
FIG. 8 illustrates the second embodiment of the present invention, and is an exploded perspective view illustrating the gas discharge structure for a battery cover.

FIG. 5 is a sectional view illustrating a gas discharge structure for a battery cover according to this embodiment. FIG. 6 is a main-portion enlarged view in which the part E in FIG. 5 is enlarged. FIG. 7 is a perspective view illustrating the gas discharge structure for a battery cover according to this embodiment. FIG. 8 is an exploded perspective view illustrating the gas discharge structure for a battery cover according to this embodiment. Note that, in FIGS. 5 and 6, the inside of the battery module is schematically illustrated.

First, arrangement of battery covers and hoses will be described. FIGS. 5 to 8 each illustrates a case where plural battery modules 103A and 103B are arranged in a lateral direction.

The battery modules 103A and 103B each includes: for example, a module housing; plural cells contained within the module housing; an electrically conductive member that electrically connects the cells; battery-module side terminals 130A, 131A, 130B, and 131B for conducting electricity generated in the cells to the outside of the battery modules 103A and 103B; and a cell monitoring unit for monitoring each of the cells. As for each of the cells, a lithium-ion battery is used, for example.

Each of the battery modules 103A and 103B has a cuboid shape, and the hollow, cuboid battery covers are assembled to the upper portions and the lower portions of the housings of the battery modules 103A and 103B, respectively.

The plural cells and the battery-module side terminals in each of the battery modules are connected electrically in series to each other with an electrically conductive member, and electricity generated in each of the cells is designed to be conducted through the battery-module side terminal to the outside of the battery modules 103A and 103B.

The module housing of each of the battery modules 103A and 103B is provided with gas release ports from which the gas generated from each of the cells is released. In FIG. 8, gas release ports 151A and 151B are disposed at the upper surfaces of the battery modules 103A and 103B, respectively, and gas release ports 152A and 152B are disposed at the lower surfaces of the battery modules 103A and 103B, respectively.

Openings 101A0 and 101B0 that each have a rectangular shape and open downward are provided on the lower surfaces of upper-surface battery covers 101A and 101B, respectively. Furthermore, openings 102A0 and 102B0 that each have a rectangular shape and open upward are provided on the upper surface of lower-surface battery covers 102A and 102B, respectively. Thus, each of the battery covers 101A, 101B, 102A, and 102B has a box-shaped structure in which one face of the hollow cuboid is open.

As illustrated in FIG. 6, an upper end portion of the battery module 103A is inserted into the inside of the upper-surface battery cover 101A through the opening 101A0. The entire circumference of a peripheral edge portion of the upper surface of the battery module 103A is airtightly joined to the inner walls of the upper-surface battery cover 101A. With this configuration, a gas collection space 171A demarcated by the upper surface of the battery module 103A and the inner surface of the upper-surface battery cover 101A is formed at the upper portion of the battery module 103A.

Similarly, at the upper portion of the housing of the battery module 103B, an upper-surface battery cover 101B is assembled, and a gas collection space 171B is formed.

At the lower portion of the housing of each of the battery modules 103A and 103B, a lower-surface battery cover is assembled as is the case with the upper portion thereof. As illustrated in FIG. 5, at the lower portion of each of the battery modules 103A and 103B, gas collection spaces 172A and 172B are formed, respectively.

Gas released from the gas release ports 151A, 151B, 152A, and 152B is collected in the gas collection spaces 171A, 171B, 172A, and 172B, respectively. The battery module and the battery cover are airtightly joined to each other, thereby forming a sealed gas collection space. This makes it possible to prevent the gas from being released from the gas collection spaces 171A, 171B, 172A, and 172B to the outside of the battery cover.

On a side surface of the battery cover, a through-hole that allows the inside and the outside of the battery cover to communicate with each other is provided. More specific descriptions thereof will be made with reference to FIG. 5. A through-hole 101 A2 is provided on a side surface on the side of the upper-surface battery cover 101B of both sides of the upper-surface battery cover 101A, in other words, the through-hole 101A2 is provided on the side surface that faces the upper-surface battery cover 101B, and a through-hole 101A1 is provided on the other side surface. Furthermore, a through-hole 101B1 is provided on the side surface on the side of the upper-surface battery cover 101A of both side surfaces of the upper-surface battery cover 102A, in other words, on the side surface that faces the upper-surface battery cover 101A, and a through-hole 101B2 is provided on the other side surface.

Similarly, a through-hole 102B2 is provided on the side surface on the side of the lower-surface battery cover 102A of both side surfaces of the lower-surface battery cover 102B, in other words, on the side surface that faces the lower-surface battery cover 102A, and a through-hole 102B1 is provided on the other side surface. Furthermore, a through-hole 102A1 is provided on the side surface on the side of the lower-surface battery cover 102B of both side surfaces of the lower-surface battery cover 102A, in other words, on the side surface that faces the lower-surface battery cover 102B.

One end of a hose 119*a* (first hose) is joined to the battery cover 101A at the through-hole 101A1. The other end of the hose 119*a* is made slightly protruded from the electric-wire lead-out hole 9*a* of the dash panel 9 into the engine compartment 11, or is located at a position substantially equal to the electric-wire lead-out hole 9*a*, as in the first embodiment.

Hollow, tubular hoses 119*b*, 119*c*, and 119*d* (second hoses) are provided between the battery covers 101A, 101B, 102A, and 102B. More specific descriptions thereof will be made with reference to FIG. 5. Both ends of the hose 119*b* are joined to the battery covers 101A and 101B at the through-holes 101A2 and 101B1, respectively. Both ends of the hose 119*c* are joined to the battery covers 101B and 102B at the through-holes 101B2 and 102B1, respectively. Both ends of the hose 119*d* are joined to the battery covers 102B and 102A at the through-holes 102B2 and 102A1, respectively.

At the joined portions between each of the battery covers 101A, 101B, 102A, and 102B and each of the hoses 119a, 119b, 119c, and 119d, the entire circumference of the openings of the hose end portion and the entire circumference of the inner walls of the through-hole are joined without any space. In order to form a structure having joints as described above, it is preferable to integrally form each of the battery covers and each of the hoses.

As described above, a space 160a within the hose 119a is communicated with the gas collection space 171A through the through-hole 101A1. A space 160b within the hose 119b is communicated with the gas collection spaces 171A and 171B through the through-holes 101A2 and 101B1, respectively. A space 160c within the hose 119c is communicated with the gas collection space 171B and the gas collection space 172B through the through-holes 101B2 and 102B1, respectively. A space 160d within the hose 119d is communicated with the gas collection spaces 172B and 172A through the through-holes 102B2 and 102A1, respectively.

It should be noted that it is desirable to make the battery covers 101A, 102A, 101B, and 102B with a flexible material so that the gas collection spaces are airtightly sealed. The material that satisfies this condition includes, for example, rubber and resin.

Furthermore, it is desirable to make the battery covers 101A, 102A, 101B, and 102B, and the hoses 119a, 119b, 119c, and 119d with an insulating material so that, even if they are brought into contact with the electrically conductive member of the battery modules 3A and 3B or the battery-module side terminals 130A, 131A, 130B, and 131B, electrical current does not leak. The material that satisfies this condition includes, for example, rubber and resin.

The battery-module side terminals 130A and 131A are provided on the upper surface of the battery module 103A, and function as a positive-side terminal and a negative-side terminal of the battery module 103A, respectively. In the state where the upper-surface battery cover 101A is assembled to the upper portion of the housing of the battery module 103A, these terminals are electrically connected to the cover-side terminals 120A and 121A provided on the upper-surface battery cover 101A, respectively.

The battery-module side terminals 130B and 131B are provided on the upper surface of the battery module 103B, and function as a positive-side terminal and a negative-side terminal of the battery module 103B, respectively. In the state where the upper-surface battery cover 101B is assembled to the upper portion of the housing of the battery module 103B, these terminals are electrically connected to the cover-side terminals 120B and 121B provided on the upper-surface battery cover 101B.

The cover-side terminals 120A, 121A, 120B, and 121B are formed by electrically conductive members.

The cover-side terminal 120A is connected with one end of an electric wire 113a passing through the space 160a within the hose 119a. Furthermore, the cover-side terminals 121A and 120B are connected with both ends of an electric wire 113b passing through the space 160b within the hose 119b. The cover-side terminal 121B is connected with one end of an electric wire 113c passing through the spaces 160a and 160b.

With these configurations, the electric wires 113a, 113b, and 113c are electrically connected to the battery modules 103A and 103B.

With the electric connections of the electric wires 113a, 113b, and 113c, the cover-side terminals 120A, 121A, 120B, and 121B, and the battery-module side terminals 130A, 131A, 130B, and 131B, the battery modules 103A and 103B are connected in series.

By connecting the other end of each of the electric wires 113a and 113c with, for example, an inverter or junction box, not illustrated, mounted on a vehicle, the electric power from the battery modules 103A and 103B is supplied to a non-illustrated motor for driving a vehicle.

In this embodiment, the hoses 119a and 119b through which the electric wires 113a, 113b, and 113c pass are used as hoses for drawing out the electric wires.

Next, passages through which gas generated in the battery modules flows will be described.

Gas generated from the battery module 103A and released from the gas release port 152A is collected in the gas collection space 172A. The gas collected in the gas collection space 172A passes through the space 160d, moves to the gas collection space 172B, and is collected in the gas collection space 172B.

Gas generated from the battery module 103B and released from the gas release port 152B is collected in the gas collection space 172B. The gas collected in the gas collection space 172B passes through the space 160c, moves to the gas collection space 171B, and is collected in the gas collection space 171B.

Gas generated from the battery module 103B and released from the gas release port 151B is collected in the gas collection space 171B. The gas collected in the gas collection space 171B passes through the space 160b, moves to the gas collection space 171A, and is collected in the gas collection space 171A.

Gas generated from the battery module 103A and released from the gas release port 151A is collected in the gas collection space 171A. The gas collected in the gas collection space 171A passes through the space 160a, and is discharged from the opening 37 into the engine compartment 11.

As described above, the gas passes through in the order of: the gas collection space 172A, the space 160d, the gas collection space 172B, the space 160c, the gas collection space 171B, the space 160b, the gas collection space 171A, and the space 160a, whereby the gas generated from the battery modules 103A and 103B is finally discharged into the engine compartment 11 from the opening 37.

It should be noted that, in order to guarantee the gas discharge passage, the hose used has an inside diameter larger than the diameter of each of the electric wires 113a, 113b, and 113c. This achieves a further increase in the sectional area of the gas discharge passage, whereby it is possible to discharge the gas in a more efficient manner.

In the second embodiment, one end of the hose 119a (first hose) is joined to the battery cover 101A at the through-hole 101A1. The other end of the hose 119a is made slightly protruded from the electric-wire lead-out hole 9a of the dash panel 9 into the engine compartment 11, or is located at a position substantially equal to the electric-wire lead-out hole 9a, as in the first embodiment. Thus, as in the first embodiment, in this second embodiment, there is no need to form a dedicated hole on the vehicle body panel for drawing out the pipe for gas discharge, and further, there is no need to additionally form a hole on the vehicle body panel for discharging the gas. This makes it possible to obtain an operation and effect similar to those obtained in the first embodiment.

Unlike the first embodiment in which the entire battery module is accommodated within the battery cover, this embodiment employs a structure of a battery cover that covers the gas release port for releasing the gas generated in the battery module. In this embodiment, each of the hoses 119a, 119b, 119c, and 119d between the battery covers has a flexibility, and can be bent and contracted. Thus, it is possible to flexibly optimize the arrangement of the battery modules 103A and 103B so as to adapt to the shape of a place to which the battery modules are arranged.

For example, even if the shape of a space to which the battery modules are arranged varies with variation in vehicle models, it is possible to arrange battery modules and battery covers having the same design, and hence, it is possible to reduce the cost of designing vehicles.

(Third Embodiment)

Figure 9:
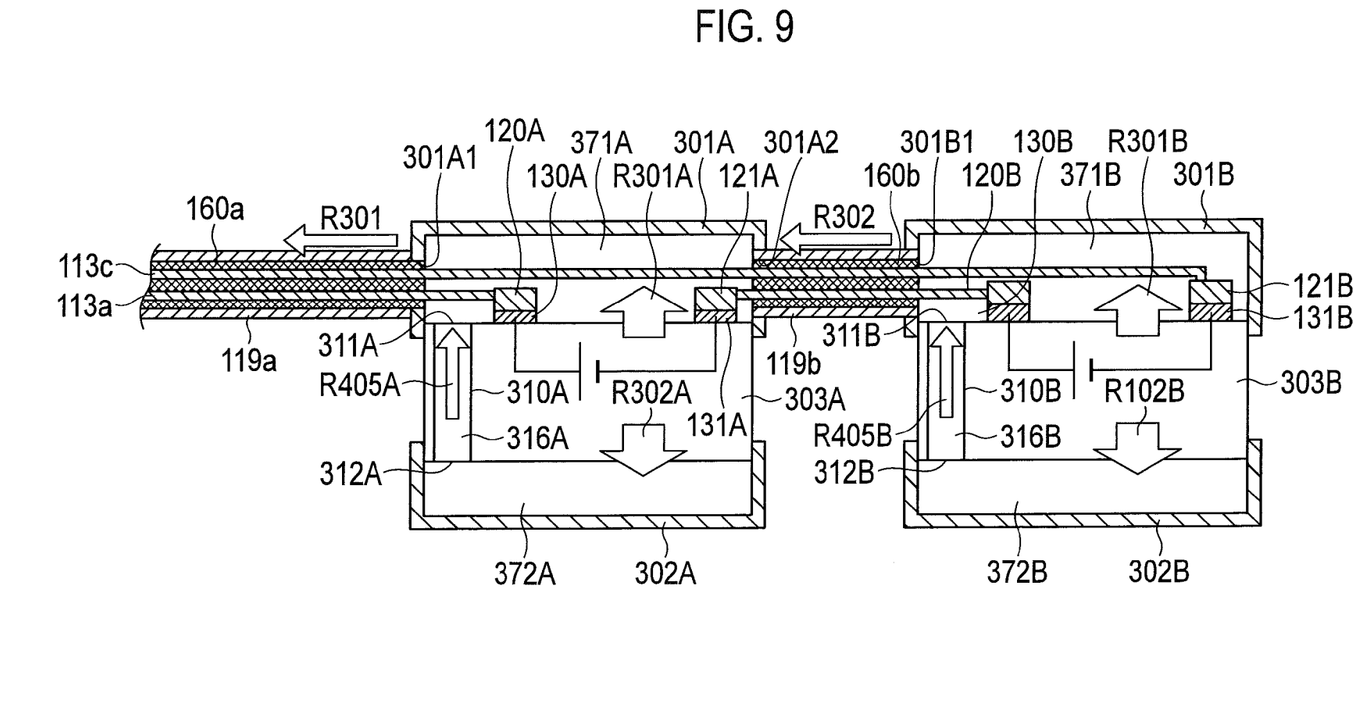
FIG. 9 illustrates a third embodiment of the present invention, and is a view corresponding to FIG. 5 (sectional view).

FIG. 9 is a sectional view illustrating a gas discharge structure for a battery cover according to this embodiment. Descriptions will be made with reference to the drawings in which the same reference characters are attached to the same constitutional portions as those in the embodiments described above, and explanation thereof will not be repeated. Note that the inside of each battery module is schematically illustrated.

This embodiment is characterized in that, instead of the hoses 119c and 119d, gas conduit pipes 310A and 310B are provided to the housings constituting battery modules 303A and 303B, respectively.

A gas conduit pipe 310A has a hollow, tubular shape. The upper surface and the lower surface of a battery module 303A have openings 311A and 312A, respectively. Through the openings 311A and 312A, a space 316A within the gas conduit pipe 310A communicates with an upper-surface gas release space 371A and a lower-surface gas release space 372A, respectively.

A gas conduit pipe 310B is formed in a similar manner to the gas conduit pipe 310A. The upper surface and the lower surface of the battery module 303B have openings 311B and 312B, respectively. Through the openings 311B and 312B, a space 316B within the gas conduit pipe 310B communicates with an upper-surface gas release space 371B and a lower-surface gas release space 372B, respectively.

Next, passages through which gas generated in each of the battery modules flows will be described.

Gas released from a gas release port on the lower surface of the battery module 303A is collected in the gas collection space 372A. The gas collected in the gas collection space 372A passes through the space 316A within the gas conduit pipe 310A, moves to the gas collection space 371A, and is collected in the gas collection space 371A.

Gas released from a gas release port on the lower surface of the battery module 303B is collected in the gas collection space 372B. The gas collected in the gas collection space 372B passes through the space 316B within the gas conduit pipe 310B, moves to the gas collection space 371B, and is collected in the gas collection space 371B.

Gas released from a gas release port on the upper surface of the battery module 303A is collected in the gas collection space 371A. Gas released from a gas release port on the upper surface of the battery module 303B is collected in the gas collection space 371B. The gas collected in the gas collection spaces 371A and 371B is discharged into the engine compartment 11 in a similar manner to that in the second embodiment.

As described above, the gas passes through in the order of: the gas collection space 372A, the space 316A, the gas collection space 371A, and the space 160a, whereby the gas generated from the battery module 303A is finally discharged into the engine compartment 11 from the opening 37. Furthermore, the gas passes through in the order of: the gas collection space 372B, the space 316B, the gas collection space 371B, the space 160b, the gas collection space 371A, and the space 160a, whereby the gas generated from the battery module 303B is finally discharged into the engine compartment 11 from the opening 37.

In this third embodiment, one end of the hose 119a (first hose) is joined to a battery cover 301A at a through-hole 301A1. The other end of the hose 119a is made slightly protruded from the electric-wire lead-out hole 9a of the dash panel 9 into the engine compartment 11, or is located at a position substantially equal to the electric-wire lead-out hole 9a, as in the first embodiment. Thus, as in the first embodiment, in this third embodiment, there is no need to form a dedicated hole on the vehicle body panel for drawing out the pipe for gas discharge, and further, there is no need to additionally form a hole on the vehicle body panel for discharging gas. This makes it possible to obtain an operation and effect similar to those obtained in the first embodiment.

Furthermore, each of the hoses 119a and 119b has a flexibility, and can be bent and contracted. Thus, it is possible to flexibly optimize the arrangement of the battery modules 303A and 303B so as to adapt to the shape of a place to which the battery modules are arranged. This makes it possible to obtain an operation and effect similar to those obtained in the second embodiment.

In this embodiment, the battery modules 303A and 303B are provided with the gas conduit pipes 310A and 310B, respectively, thereby achieving a simplified structure, in which no hose that connects the upper-surface battery cover 301B and the lower-surface battery cover 302B is necessary, and no hose that connects the lower-surface battery cover 302A and the lower-surface battery cover 302B is necessary. By employing this structure, it is possible to reduce troubles such as breakage of cables and crushing of cables during assembling processes or during use.

Furthermore, with the structure being simplified, it is possible to reduce, for example, the cost of manufacturing a mold necessary for integrally forming the cover or the maintenance cost.

(Fourth Embodiment)

Figure 10:
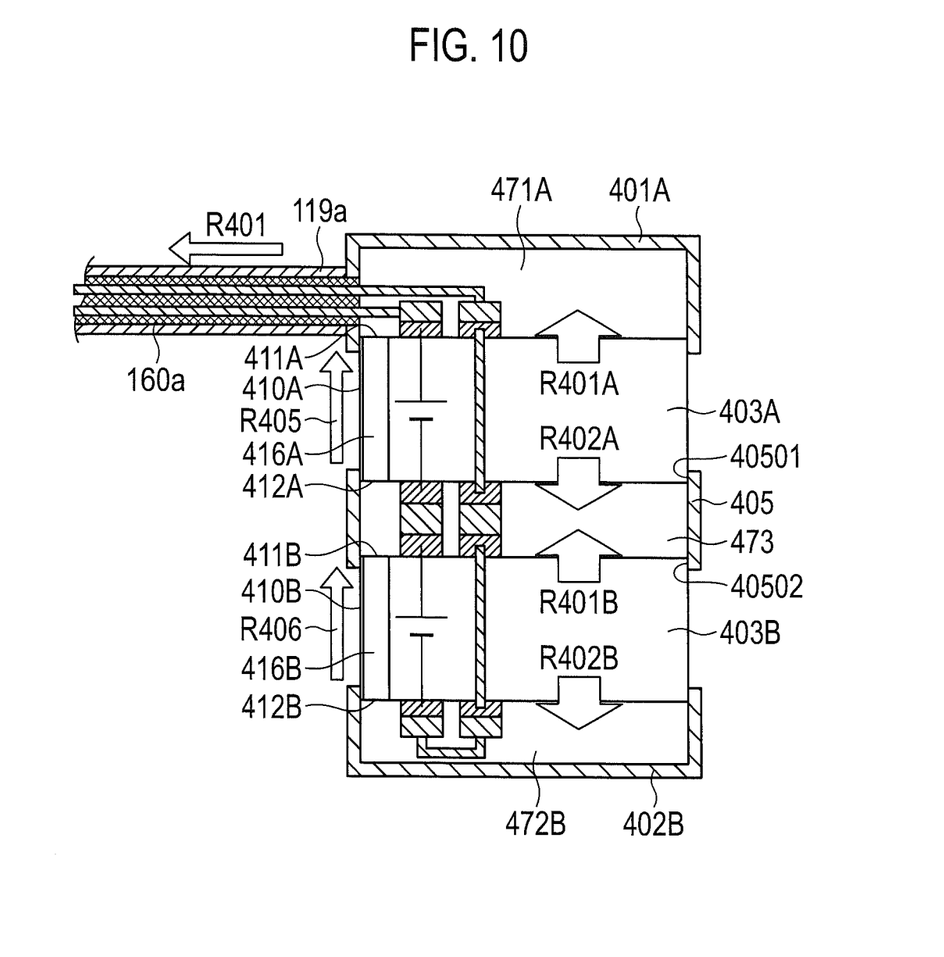
FIG. 10 illustrates a fourth embodiment of the present invention, and is a view corresponding to FIG. 5 (sectional view).

FIG. 10 is a sectional view illustrating a gas discharge structure for a battery cover according to this embodiment. Descriptions will be made with reference to the drawings in which the same reference characters are attached to the same constitutional portions as those in the embodiments described above, and explanation thereof will not be repeated. Note that the inside of each battery module is schematically illustrated.

In this embodiment, plural battery modules are layered. More specifically, a battery module 403A is placed on a battery module 403B with an upper-and-lower-surfaces integrated battery cover 405 being placed between them. Gas conduit pipes are provided on the housing of each of the battery modules. The upper-and-lower-surfaces integrated battery cover 405 is located between the battery modules, and covers the lower surface of the battery module 403A and the upper surface of the battery module 403B at the same time.

The upper-and-lower-surfaces integrated battery cover 405 has a hollow, cuboid shape, and has the upper surface and the lower surface having rectangular openings 40501 and 40502 provided thereon, respectively. Thus, the battery cover 405 has a tubular structure in which two faces of the upper and the lower faces of the hollow cuboid are open.

As illustrated in FIG. 10, a lower end portion of the battery module 403A is inserted into the inside of the upper-and-lower-surfaces integrated battery cover 405 through the opening 40501. The entire circumference of a peripheral edge portion of the lower surface of the battery module 403A is airtightly joined to the inner walls of the upper-and-lower-surfaces integrated battery cover 405. With this configuration, the upper-and-lower-surfaces integrated battery cover 405 is assembled to the lower portion of the housing of the battery module 403A. Furthermore, an upper end portion of the battery module 403B is inserted into the inside of the upper-and-lower-surfaces integrated battery cover 405 through the opening 40502. The entire circumference of a peripheral edge portion of the upper surface of the battery module 403B is airtightly joined to the inner walls of the upper-and-lower-surfaces integrated battery cover 405. With this configuration, the upper-and-lower-surfaces integrated battery cover 405 is assembled to the upper portion of the housing of the battery module 403B. At this time, a gas collection space 473, which is surrounded by the lower surface of the battery module 403A, the upper surface of the battery module 403B, and the inner surface of the upper-and-lower-surfaces integrated battery cover 405, is formed.

Each of the battery modules and each of the battery covers are airtightly joined to each other to seal the gas collection space 473, whereby the gas is prevented from being released from the gas collection space 473 to the outside of the battery cover.

With the configuration as described above, the gas released from the lower surface of the battery module 403A and the gas released from the upper surface of the battery module 403B are collected in the gas collection space 473. It can be said that the upper-and-lower-surfaces integrated battery cover 405 functions as both an upper-surface battery cover and a lower-surface battery cover at the same time.

Furthermore, as in the second embodiment, the upper surface of the battery module 403A is covered with an upper-surface battery cover 401A, and the lower surface of the battery module 403B is covered with a lower-surface battery cover 402B.

Next, passages through which gas generated in each of the battery modules flows will be described.

Gas released from a gas release port on the lower surface of the battery module 403B is collected in a gas collection space 472B. The gas collected in the gas collection space 472B passes through a space 416B, moves to the gas collection space 473, and is collected in the gas collection space 473.

Gas released from a gas release port on the lower surface of the battery module 403A and gas released from a gas release port on the upper surface of the battery module 403B are collected in the gas collection space 473. The gas collected in gas collection space 473 passes through a space 416A, moves to a gas collection space 471A, and is collected in a gas collection space 471A.

Gas released from a gas release port on the upper surface of the battery module 403A is collected in the gas collection space 471A. The gas collected in the gas collection space 471A is discharged into the engine compartment 11 as in the second embodiment.

As described above, the gas passes through in the order of: the gas collection space 472B, the space 416B, the gas collection space 473, the space 416A, the gas collection space 471A, and the space 160a, whereby the gas generated from each of the battery modules 403A and 403B is finally discharged into the engine compartment 11 from the opening 37.

In this fourth embodiment, one end of the hose 119a (first hose) is joined to the battery cover 401A at a through-hole formed on the battery cover 401A. The other end of the hose 119a is made slightly protruded from the electric-wire lead-out hole 9a of the dash panel 9 into the engine compartment 11, or is located at a position substantially equal to the electric-wire lead-out hole 9a, as in the first embodiment. Thus, as in the first embodiment, in this fourth embodiment, there is no need to form a dedicated hole on the vehicle body panel for drawing out the pipe for gas discharge, and there is no need to additionally form a hole on the vehicle body panel for discharging the gas. This makes it possible to obtain an operation and effect similar to those obtained in the first embodiment.

Furthermore, the hose 119a has a flexibility, and can be bent and contracted. Thus, it is possible to flexibly optimize the arrangement of the battery modules 403A and 403B so as to adapt to the shape of a place to which the battery modules are arranged. This makes it possible to obtain an operation and effect similar to those obtained in the second and the third embodiments.

In this embodiment, no hose for connecting the battery covers exists, and there exists only the hose 119a for connecting the electric-wire lead-out hole 9a of the dash panel 9 with the upper-surface battery cover 401A. Thus, it is possible to reduce troubles such as breakage of cables and crushing of cables during assembling processes or during use.

(Other Modes Included in Scope of Present Invention)

In the second embodiment to the fourth embodiment, the space between the hose and the electric wire is used for the gas discharge passage. However, as in the first embodiment, it may be possible to employ a configuration in which a mesh, which is a fluid-permeable member that allows fluid to pass therethrough, is accommodated in the space between the hose and the electric wire. With this configuration, the mesh functions as a filter as in the first embodiment, and catches, for example, a foreign substance such as a bug or an unwanted substance, whereby it is possible to prevent such a foreign substance from entering the vehicle compartment from the outside of the vehicle compartment. Furthermore, with the intervention of the mesh in the space, it is possible to prevent the space from flattening, and the space serving as the passage for the gas can be guaranteed, whereby it is possible to more reliably discharge the gas.

Furthermore, by forming the mesh with an electrically conductive material, and connecting each battery module and the mesh, it is possible to establish grounding of the battery modules 103A, 103B, 303A, 303B, 403A, and 403B. By surrounding the circumference of each electric wire with the mesh made of the electrically conductive material, it is possible to reduce electrical noise emitted from the electric wire.

In the second embodiment to the fourth embodiment, only two battery modules are given. However, it may be possible to employ a configuration in which plural battery modules (including one battery module) exist.

In the third embodiment and the fourth embodiment, gas conduit pipes are provided to the housing constituting each battery module. However, it may be possible to provide, for each battery module, a hose that communicates with the upper-surface battery cover and the lower-surface battery cover, thereby obtaining a gas conduit pipe having a structure that is provided separately from the housing.

It may be possible to reach an embodiment in which each gas release port of each of plural battery modules is covered with a battery cover obtained by combining the second embodiment to the fourth embodiment. In other words, the arrangement of battery modules is not limited to those arranged in a horizontal direction or in a vertical direction. It may be possible to modify the arrangement of battery modules so as to adapt to the shape of a space in a vehicle.

In each of the embodiments, the high voltage cable is led out from the battery cover disposed within the console box in the vehicle compartment into the engine compartment (motor compartment) 11, which is outside of the vehicle compartment, through the electric-wire lead-out hole 9*a*. At this time, by disposing the electric-wire lead-out hole 9*a* at a position where negative pressure is generated during the vehicle running, the opening 37 of the space 33 between the electric wire body 13 and the hose 19 toward the engine compartment (motor compartment) 11 is also disposed at a position where negative pressure is generated.

As a result, when the battery module 3 supplies electric power to the motor during the vehicle running, it is possible to draw the gas within the battery cover 1 from the outside of the vehicle compartment with the negative pressure described above, whereby it is possible to more efficiently discharge the gas.

It should be noted that the end portion 19*d* of the hose 19 may be made to pass through a floor panel, not illustrated, instead of making the end portion 19*d* pass through the dash panel 9. With this configuration, the gas released from the battery module in the battery cover can be discharged to the outside of the vehicle compartment under the floor. In this case, the high voltage cable 7 drawn out under the floor is cabled to the engine compartment (motor compartment) 11 located in the front part of the vehicle in a state where the high voltage cable 7 is protected with, for example, a protector.

In each of the embodiments described above, the gas discharge passage is guaranteed using the high voltage cable. However, the gas discharge passage may be guaranteed using, for example, a low voltage cable or signal line in a similar manner.

Descriptions have been made of embodiments of the present invention. However, these embodiments are described merely as examples in order to facilitate understanding of the present invention, and the present invention is not limited to these embodiments. The technical scope of the present invention is not limited to the specific technical matters disclosed in each of the embodiments but also includes various modifications, changes, and alternative techniques that can be easily obtained from these technical matters.

According to the present invention, the gas collected in the space within the battery cover is made to pass through the space between the electric wire connected with the battery module and the hose surrounding the electric wire, and is discharged to the outside of the vehicle compartment. Thus, it is possible to discharge the gas within the battery cover to the outside of the vehicle compartment without forming a dedicated hole on the vehicle body panel for drawing out the pipe for discharging gas. As a result, there is no need to additionally form a hole on the vehicle body panel for drawing out a dedicated pipe for gas discharge, whereby it is possible to reduce intrusion of noises from the outside of the vehicle compartment into the inside of the vehicle compartment through the hole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1, 101A, 102A, 101B, 102B, 301A, 302A, 301B, 302B, 401A, 402B, 405 battery cover
1*a*, 101A1, 101A2, 101B1, 101B2, 102A1, 102B1, 102B2 through-hole
3, 103A, 103B, 303A, 303B, 403A, 403B battery module
5 junction box (electrical component)
9 dash panel
9*a* electric-wire lead-out hole on dash panel
11 engine compartment (outside of vehicle compartment)
13, 113*a*, 113*b*, 113*c* electric wire body (electric wire) of high voltage cable
15 connector of high voltage cable
19, 119*a* first hose
119*b*, 119*c*, 119*d* second hose
19*d* end portion of hose
21 mesh (net-like member, fluid-permeable member)
23 mounting flange
31, 33, 160*a*, 160*b*, 160*c*, 160*d*, 316A, 316B, 416A, 416B communication passage (space)
35, 171A, 172A, 171B, 172B, 371A, 372A, 371B, 372B, 471A, 472B, 473 gas collection space
37 opening of space to engine compartment
151A, 152A, 151B, 152B gas release port
310A, 310B, 410A, 410B gas conduit pipe

The invention claimed is:

1. A gas discharge structure for a battery cover, comprising:
a battery cover that covers part or all of a battery, and that covers a gas release port of the battery;
a first hose that is connected with the battery cover at a position of a through-hole provided on the battery cover; and
an electric wire that is electrically connected to the battery, is inserted into the first hose, and is drawn out to an outside of a vehicle compartment through an electric-wire lead-out hole provided on a vehicle body panel,
wherein a space formed between the electric wire and the first hose communicates with a space inside the battery cover,
wherein the space formed between the electric wire and the first hose is in fluid communication with gas discharge from the battery,
wherein an end portion of the first hose is located at a position corresponding to the electric-wire lead-out hole, so that an opening of the space formed between the electric wire and the first hose faces the outside of the vehicle compartment, and
wherein the space inside the battery cover communicates with the outside of the vehicle compartment via the space formed between the electric wire and the first hose.

2. A gas discharge structure for a battery cover, comprising:
a battery cover that covers part or all of a battery;
a first hose that is connected with the battery cover at a position of a through-hole provided on the battery cover; and
an electric wire that is electrically connected to the battery, is inserted into the first hose, and is drawn out to an outside of a vehicle compartment through an electric-wire lead-out hole provided on a vehicle body panel, wherein a space formed between the electric wire and the first hose communicates with a space inside the battery cover, wherein an end portion of the first hose is located at a position corresponding to the electric-wire lead-out hole, so that an opening of the space formed between the electric wire and the first hose faces the outside of the vehicle compartment, and wherein the battery cover is fixed to a housing of the battery so as to cover a gas release port of the battery.

3. A gas discharge structure for a battery cover, comprising:
a battery cover that covers part or all of a battery;
a first hose that is connected with the battery cover at a position of a through-hole provided on the battery cover; and
an electric wire that is electrically connected to the battery, is inserted into the first hose, and is drawn out to an outside of a vehicle compartment through an electric-wire lead-out hole provided on a vehicle body panel, wherein a space formed between the electric wire and the first hose communicates with a space inside the battery cover, wherein an end portion of the first hose is located at a position corresponding to the electric-wire lead-out hole, so that an opening of the space formed between the electric wire and the first hose faces the outside of the vehicle compartment, wherein the gas discharge structure further comprises:
a plurality of the battery covers; and
a second hose that is connected with the plurality of the battery covers, and wherein a space inside the second hose communicates with spaces inside the plurality of the battery covers.

4. The gas discharge structure for a battery cover according to claim 1,
wherein the electric wire is an electric wire for high voltage.

5. The gas discharge structure for a battery cover according to claim 1,
wherein the space formed between the electric wire and the first hose accommodates a fluid-permeable member that is fluid-permeable.

6. The gas discharge structure for a battery cover according to claim 5,
wherein the fluid-permeable member is a net-like member.

7. The gas discharge structure for a battery cover according to claim 6,
wherein the net-like member that is conductive is integrally mounted on a mounting flange, and the mounting flange is fixed to the battery cover around the through-hole.

8. The gas discharge structure for a battery cover according to claim 7,
wherein a connector to be connected with the battery is provided at an end portion of the electric wire and inserted into the through-hole, and
wherein a communication passage that allows an inside of the battery cover and the space to communicate with each other is provided between the connector and the mounting flange.

9. The gas discharge structure for a battery cover according to claim 1,
wherein the electric-wire lead-out hole at which the end portion of the first hose is located is provided at a position where negative pressure is generated during a vehicle running.

* * * * *